United States Patent
Kaneko

(10) Patent No.: US 9,652,304 B2
(45) Date of Patent: May 16, 2017

(54) ELECTRONIC APPARATUS THAT USES PROGRAM FROM ANOTHER PROGRAM WORKING ON DIFFERENT PLATFORMS, AND METHOD

(71) Applicant: KYOCERA Document Solutions Inc., Osaka (JP)

(72) Inventor: Kotaro Kaneko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/936,135

(22) Filed: Nov. 9, 2015

(65) Prior Publication Data

US 2016/0142577 A1    May 19, 2016

(30) Foreign Application Priority Data

Nov. 13, 2014  (JP) .................................. 2014-230333

(51) Int. Cl.
*G06F 9/54* (2006.01)
*H04N 1/00* (2006.01)

(52) U.S. Cl.
CPC ............. *G06F 9/54* (2013.01); *H04N 1/0097* (2013.01); *H04N 1/00915* (2013.01); *H04N 1/00941* (2013.01); *H04N 2201/0094* (2013.01)

(58) Field of Classification Search
CPC ...... G06F 17/30067; G06F 9/544; G06F 9/54; H04N 1/00941; H04N 1/0097; H04N 1/00915; H04N 2201/0094

(Continued)

(56) References Cited

U.S. PATENT DOCUMENTS 5,440,744 A      8/1995  Jacobson et al. ............. 395/650
8,875,159 B1 *  10/2014  Nieuwejaar ......... G06F 9/45537
                                                    718/100

(Continued)

FOREIGN PATENT DOCUMENTS

| JP | H 6-75889 A | 3/1994 |
| JP | 11-327917 A | 11/1999 |
| JP | 2011-118522 A | 6/2011 |

OTHER PUBLICATIONS

Kodama, T., et al., "A Proposal of a Bundle Sharing Method for OSGi Framework", 7th Forum on Information Technology of Papers, the first volume (The Institute of Electronics, Information and Communication Engineers, Aug. 20, 2008), pp. 263-264.

(Continued)

*Primary Examiner* — Thomas Lee
*Assistant Examiner* — Santosh R Poudel
(74) *Attorney, Agent, or Firm* — Stein IP, LLC

(57) ABSTRACT

An electronic apparatus includes a storage device storing a first platform, a first program working on the first platform, a second platform, and a second program working on the second platform, and a control device that performs the first program working on the first platform so as to execute at least one component of the first platform. The first platform includes a second program using unit for the first program to use the second program executing at least one component of the second platform. The second program using unit loads a necessity component necessary for performing the second program among components of the second platform from the second platform so that the second program can work on a temporary platform constituted of the loaded necessity component.

2 Claims, 8 Drawing Sheets

(58) Field of Classification Search
USPC .......................................................... 713/300
See application file for complete search history.

(56) References Cited

U.S. PATENT DOCUMENTS

| | | | | |
|---|---|---|---|---|
| 2005/0198628 A1* | 9/2005 | Graham | .................... | G06F 8/64 |
| | | | | 717/174 |
| 2006/0074988 A1* | 4/2006 | Imanishi | ............. | G06F 12/0269 |
| 2006/0294494 A1* | 12/2006 | Quinn | ................. | G06F 9/44526 |
| | | | | 717/104 |
| 2008/0133214 A1* | 6/2008 | Leventhal | ........... | G06F 9/45537 |
| | | | | 703/26 |
| 2008/0244248 A1* | 10/2008 | Childs | ..................... | G06F 9/441 |
| | | | | 713/1 |
| 2009/0288100 A1* | 11/2009 | Numata | ............. | H04N 1/00411 |
| | | | | 719/313 |
| 2011/0197203 A1* | 8/2011 | Takeuchi | ............ | G06F 9/45512 |
| | | | | 719/313 |
| 2012/0084792 A1* | 4/2012 | Benedek | .................. | G06F 9/544 |
| | | | | 719/313 |
| 2012/0084793 A1* | 4/2012 | Reeves | ............... | H04L 67/1095 |
| | | | | 719/313 |
| 2014/0043631 A1* | 2/2014 | Honma | .................. | G06F 3/1297 |
| | | | | 358/1.13 |
| 2014/0043632 A1* | 2/2014 | Uchida | ................. | G06F 3/1297 |
| | | | | 358/1.13 |
| 2014/0222876 A1* | 8/2014 | Biskeborn | ......... | G06F 17/30067 |
| | | | | 707/822 |
| 2015/0193904 A1* | 7/2015 | Vermeulen | ................ | G06T 1/20 |
| | | | | 345/522 |

OTHER PUBLICATIONS

Japanese Office Action dated Sep. 7, 2016, issued by the Japanese Patent Office in corresponding application JP2014-230333.

* cited by examiner

FIG.7

71 EXECUTION TARGET COMPONENT SPECIFYING INFORMATION

| FUNCTION | COMPONENT |
|---|---|
| FuncB-1 | COMPONENT 51a |
| FuncB-2 | COMPONENT 51b |
| FuncB-3 | COMPONENT 51c |

FIG.8

72 DEPENDENT COMPONENT SPECIFYING INFORMATION

| COMPONENT | DEPENDENT COMPONENT |
|---|---|
| COMPONENT 51a | COMPONENT 51b |
| COMPONENT 51a | COMPONENT 51c |
| COMPONENT 51a | COMPONENT 51d |
| COMPONENT 51b | COMPONENT 51c |
| COMPONENT 51b | COMPONENT 51e |
| COMPONENT 51c | COMPONENT 51d |
| COMPONENT 51c | COMPONENT 51e |

ELECTRONIC APPARATUS THAT USES PROGRAM FROM ANOTHER PROGRAM WORKING ON DIFFERENT PLATFORMS, AND METHOD

INCORPORATION BY REFERENCE

This application is based upon and claims the benefit of priority from the corresponding Japanese Patent Application No. 2014-230333 filed Nov. 13, 2014, the entire contents of which are incorporated herein by reference.

BACKGROUND

The present disclosure relates to an electronic apparatus and a method of using a program from another program, which work on different platforms.

There is known a typical method in which one of application programs working on different platforms uses the other application program.

However, in the typical method, a complicated and large-scale system is necessary.

SUMMARY

An electronic apparatus according to an aspect of the present disclosure includes a storage device storing a first platform, a first program working on the first platform, a second platform, and a second program working on the second platform, and a control device that performs the first program working on the first platform so as to execute at least one component of the first platform. The first platform includes a second program using unit for the first program to use the second program executing at least one component of the second platform, and the second program using unit loads a necessity component necessary for performing the second program among components of the second platform from the second platform so that the second program can work on a temporary platform constituted of the loaded necessity component.

A method according to another aspect of the present disclosure includes: causing an electronic apparatus to store a first platform, a first program working on the first platform, a second platform, and a second program working on the second platform; performing a first program working on the first platform so as to execute at least one component of the first platform; causing the first program to use the second program executing at least one component of the second platform; and loading a necessity component necessary for performing the second program among components of the second platform from the second platform so that the second program can work on a temporary platform constituted of the loaded necessity component.

BRIEF DESCRIPTION OF THE DRAWINGS

FIG. 7 is a schematic diagram illustrating an example of execution target component specifying information illustrated in FIG. 1.

FIG. 8 is a schematic diagram illustrating an example of dependent component specifying information illustrated in FIG. 1.

DETAILED DESCRIPTION

Now, an embodiment of the present disclosure is described with reference to the drawings.

First, a structure of a multifunction peripheral (MFP) as an electronic apparatus according to this embodiment is described.

Figure 1:
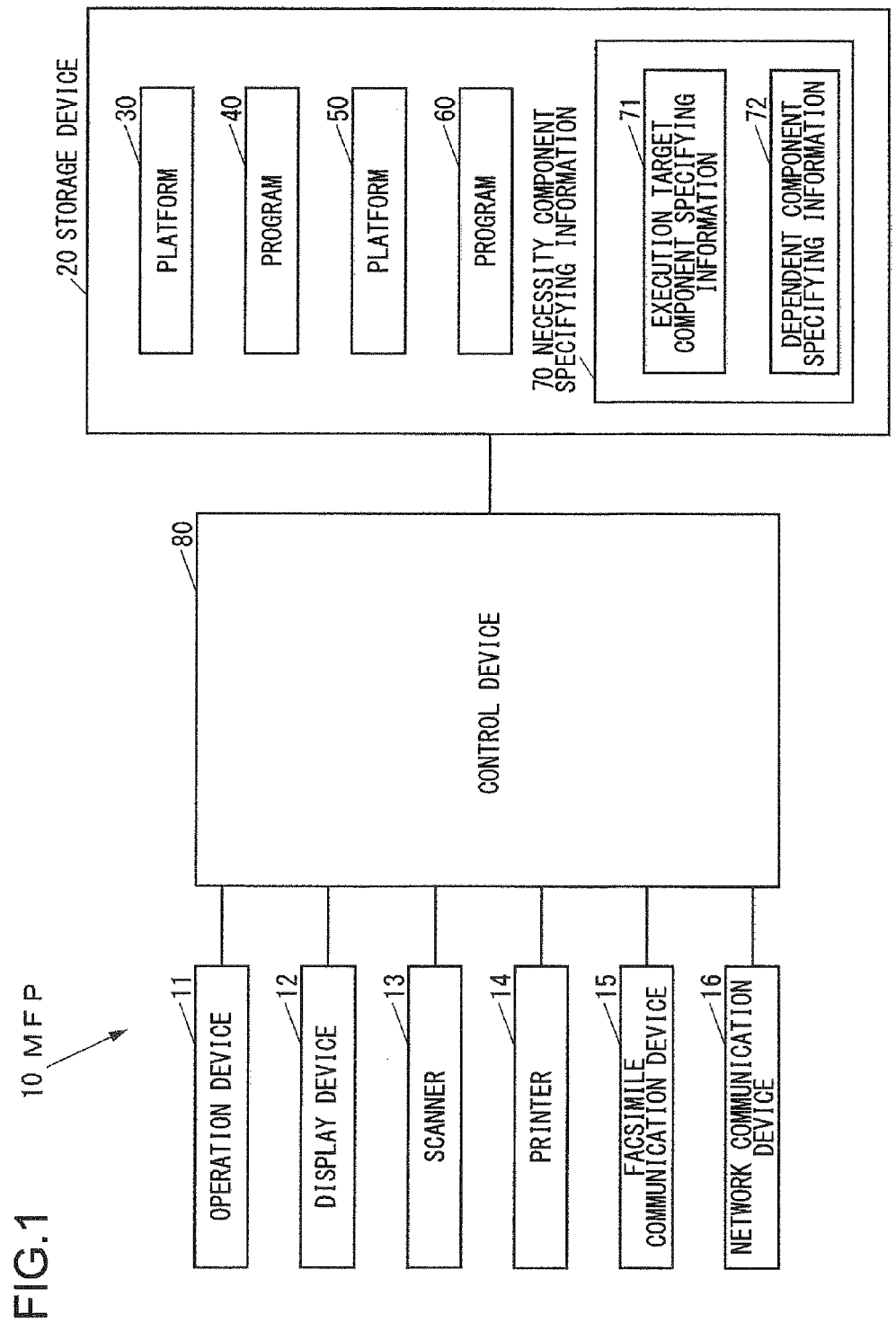
FIG. 1 is a schematic diagram illustrating a block configuration of a multifunction peripheral (MFP) according to an embodiment of the present disclosure.

FIG. 1 is a block diagram of an MFP 10 according to this embodiment.

As illustrated in FIG. 1, the MFP 10 includes an operation device 11 as an input device such as buttons for inputting various operations by a user, a display device 12 such as a liquid crystal display (LCD) for displaying various information, a scanner 13 as a reading device for reading a document to generate image data, a printer 14 as a printing device for printing on a recording medium such as a paper sheet, a facsimile communication device 15 as a facsimile device for performing facsimile communication with an external facsimile device (not illustrated) via a communication line such as a public telephone line, a network communication device 16 for performing communication with an external device via a network such as a local area network (LAN) or the Internet, an electrically erasable programmable read only memory (EEPROM) storing various data, a storage device 20 as a nonvolatile storage device such as a hard disk drive (HDD), and a control device 80 for controlling the entire MFP 10.

The storage device 20 stores a platform 30 as a "first platform" of the present disclosure, a program 40 as a "first program" of the present disclosure working on the platform 30, a platform 50 as a "second platform" of the present disclosure, and a program 60 as a "second program" of the present disclosure working on the platform 50.

The platform 30 and the platform 50 are execution environments such as Windows (registered trademark), Linux (registered trademark), Open Service Gateway initiative (OSGi) (registered trademark), on which programs work. The platform 30 and the platform 50 are different platforms.

Figure 2:
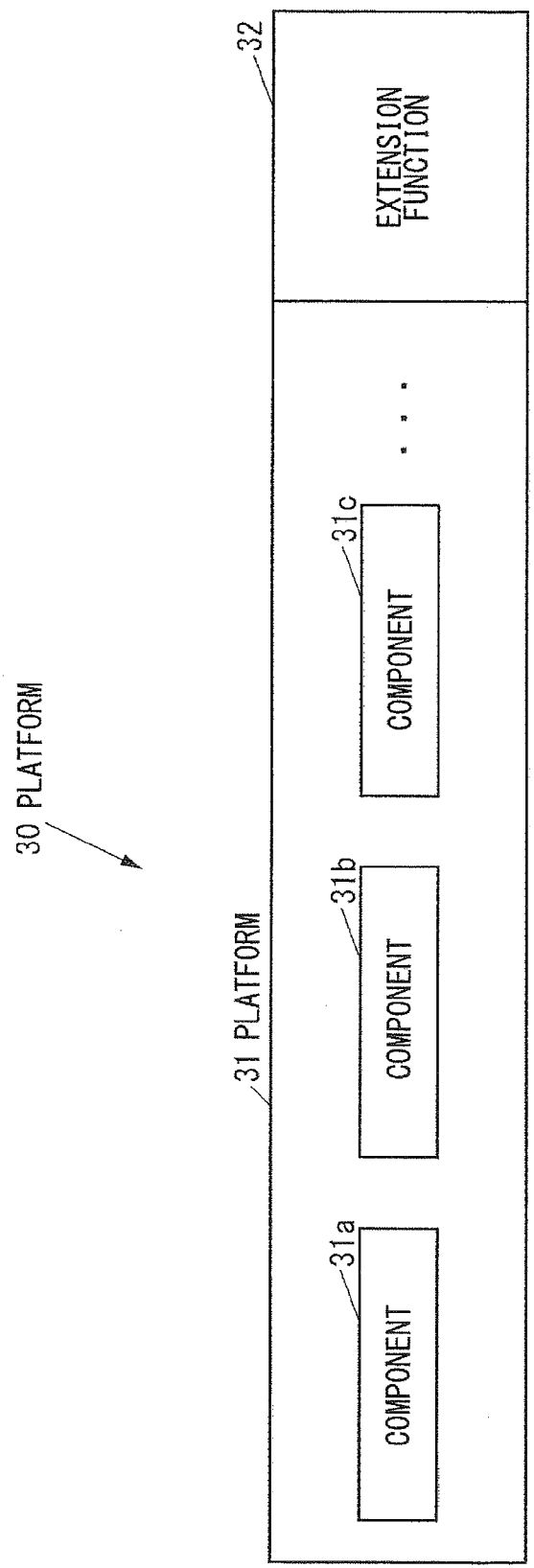
FIG. 2 is a schematic diagram illustrating an example of a first platform among two platforms illustrated in FIG. 1.

FIG. 2 is a schematic diagram illustrating an example of the platform 30.

As illustrated in FIG. 2, the platform 30 is constituted of a platform 31 and an extension function 32 for extending functions of the platform 31.

The platform 31 is constituted of a plurality of components including a component 31a, a component 31b, and a component 31c. Each of the components constituting the platform 31 is made up of at least one application program interface (API).

The extension function 32 is made up of at least one API. The extension function 32 is a function for the program 40 (see FIG. 1) to use the program 60 (see FIG. 1), and constitutes a second program using unit of the present disclosure.

Figure 3:
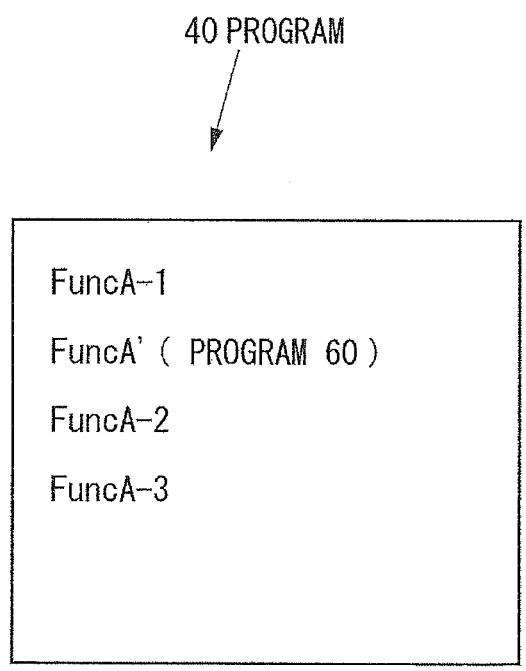
FIG. 3 is a schematic diagram illustrating an example of codes of a first program among two programs illustrated in FIG. 1.

FIG. 3 is a schematic diagram illustrating an example of codes of the program 40.

As illustrated in FIG. 3, the program 40 is a program described in a script language, for executing functions in order of "FuncA-1", "FuncA' (program 60)", "FuncA-2", and "FuncA-3".

Here, "FuncA-1" is a function for executing the component 31a (see FIG. 2) of the platform 30 (see FIG. 2). In the same manner, "FuncA-2" and "FuncA-3" are functions for respectively executing the component 31b (see FIG. 2) and the component 31c (see FIG. 2) of the platform 30.

In addition, "FuncA'" is a function for executing the extension function 32 (see FIG. 2) of the platform 30. Here, the "program 60" of "FuncA' (program 60)" is an argument passed to the extension function 32, to which codes of the program 60 are actually input.

Figure 4:
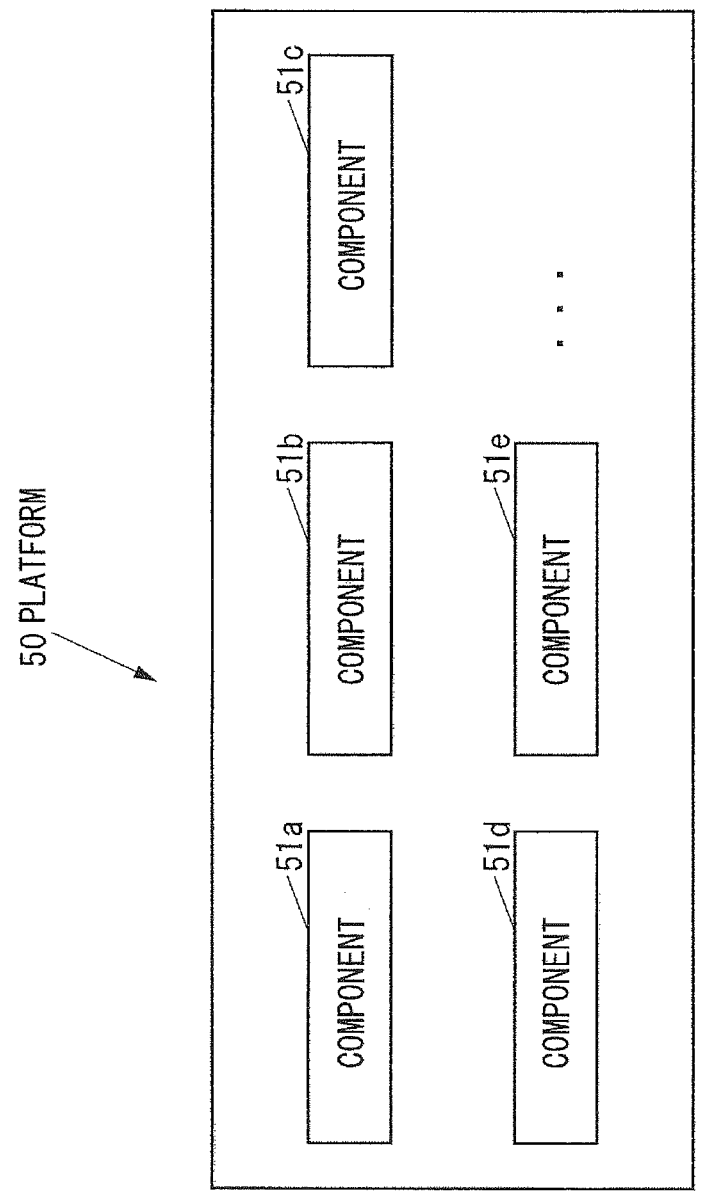
FIG. 4 is a schematic diagram illustrating an example of a second platform out of two platforms illustrated in FIG. 1.

FIG. 4 is a schematic diagram illustrating an example of the platform 50.

As illustrated in FIG. 4, the platform 50 is constituted of a plurality of components including a component 51a, a component 51b, a component 51c, a component 51d, and a component 51e. Each of the components constituting the platform 50 is made up of at least one API.

Figure 5:
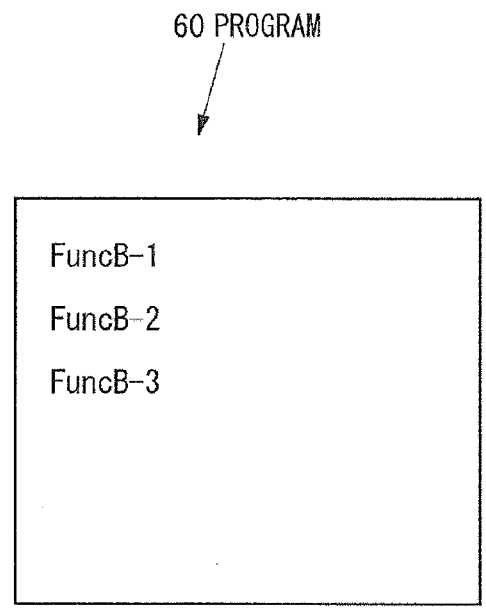
FIG. 5 is a schematic diagram illustrating an example of a second program among two programs illustrated in FIG. 1.

FIG. 5 is a schematic diagram illustrating an example of the codes of the program 60.

As illustrated in FIG. 5, the program 60 is a program described in a script language, for performing functions in order of "FuncB-1", "FuncB-2", and "FuncB-3".

Here, "FuncB-1" is a function for executing the component 51a (see FIG. 4) of the platform 50 (see FIG. 4). In the same manner, "FuncB-2" and "FuncB-3" are functions for respectively executing the component 51b (see FIG. 4) and the component 51c (see FIG. 4) of the platform 50.

Figure 6:
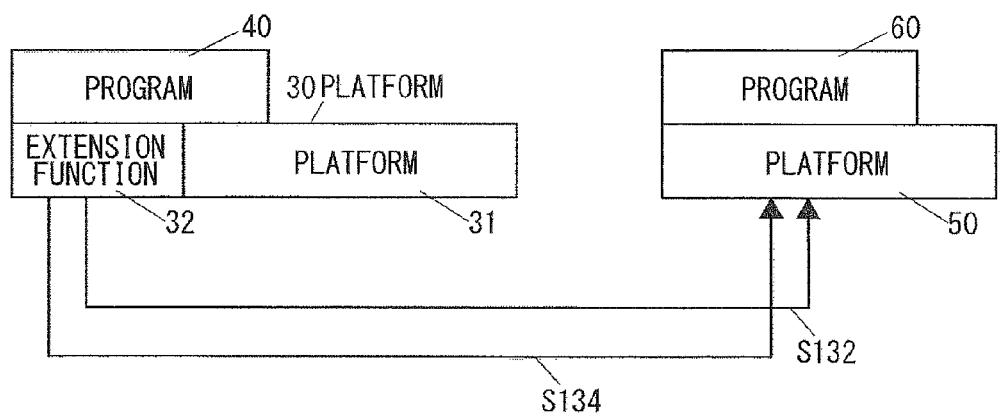
FIG. 6 is a diagram showing a relationship among the two platforms and two programs illustrated in FIG. 1.

FIG. 6 is a diagram showing a relationship among the platforms 30 and 50 and the programs 40 and 60.

As illustrated in FIG. 6, the extension function 32 of the platform 30 can partially execute the platform 50 (S132) and can stop (S134) the part of the platform 50 executed in the process of S132.

As illustrated in FIG. 1, the storage device 20 stores necessity component specifying information 70 for specifying a necessity component necessary for performing the program 60.

The necessity component specifying information 70 includes execution target component specifying information 71 for specifying execution target component as an execution target of the program 60 among components of the platform 50, and dependent component specifying information 72 for specifying a dependent component necessary for the execution target component to be an active state among components of the platform 50.

FIG. 7 is a schematic diagram illustrating an example of the execution target component specifying information 71.

The execution target component specifying information 71 illustrated in FIG. 7 is a table showing a relationship between functions of the program 60 (see FIG. 5) and components of the platform 50 (see FIG. 4). It is understood from the execution target component specifying information 71 illustrated in FIG. 7 that the execution target components of "FuncB-1" (see FIG. 5), "FuncB-2" (see FIG. 5), and "FuncB-3" (see FIG. 5) are the component 51a (see FIG. 4), the component 51b (see FIG. 4), and the component 51c (see FIG. 4), respectively.

FIG. 8 is a schematic diagram illustrating an example of the dependent component specifying information 72.

The dependent component specifying information 72 illustrated in FIG. 8 is a table showing a relationship between a component of the platform 50 (see FIG. 4) and a dependent component as a component necessary for this component to be an active state. It is understood from the dependent component specifying information 72 illustrated in FIG. 8 that the component 51b (see FIG. 4), the component 51c (see FIG. 4), and the component 51d (see FIG. 4) are necessary for the component 51a (see FIG. 4) to become an active state. In the same manner, it can be understood that the component 51c and the component 51e (see FIG. 4) are necessary for the component 51b to become an active state. In addition, it can be understood that the component 51d and the component 51e are necessary for the component 51c to become an active state.

The control device 80 illustrated in FIG. 1 includes, for example, a central processing unit (CPU), a read only memory (ROM) storing programs and various data in advance, and a random access memory (RAM) to be used as a working area for the CPU. The CPU executes the programs stored in the ROM or the storage device 20.

Next, there is described an operation of the MFP 10 when causing the program 40 to work on the platform 30.

Figure 9:
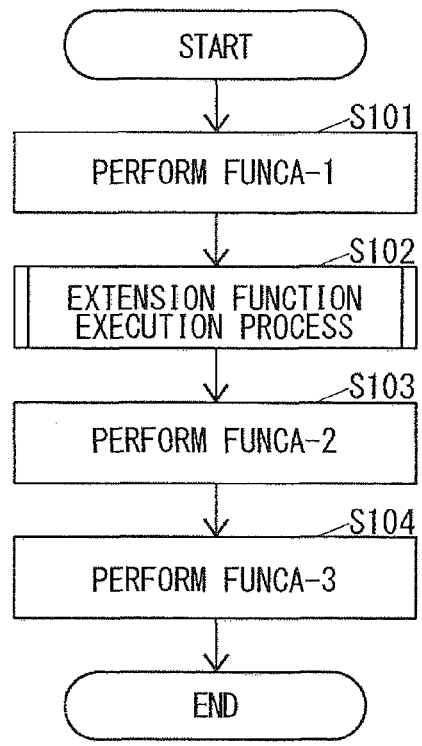
FIG. 9 is a flowchart of an operation of the MFP when causing the first program to work on the first platform.

FIG. 9 is a flowchart of an operation of the MFP 10 when causing the program 40 to work on the platform 30.

As illustrated in FIG. 9, the control device 80 first performs the "FuncA-1" of the program 40 so as to execute the component 31a of the platform 30 (S101).

Figure 10:
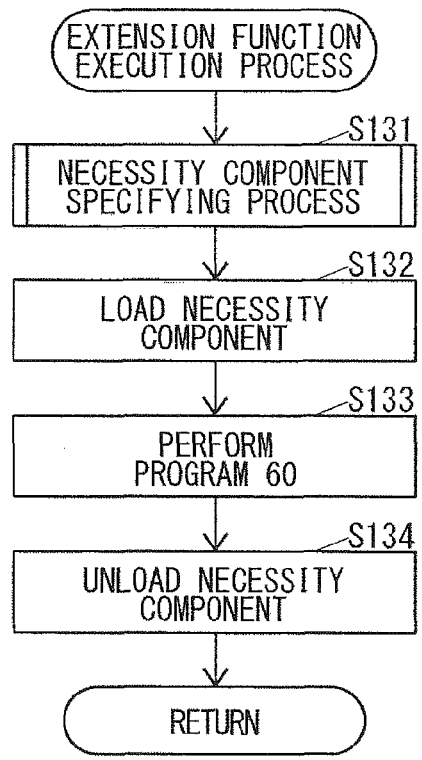
FIG. 10 is a flowchart of an extension function execution process illustrated in FIG. 9.

Next, the control device 80 performs the "FuncA' (program 60)" of the program 40 so as to execute an extension function execution process illustrated in FIG. 10 (S102) in which the extension function 32 of the platform 30 is executed.

FIG. 10 is a flowchart of the extension function execution process illustrated in FIG. 9.

Figure 11:
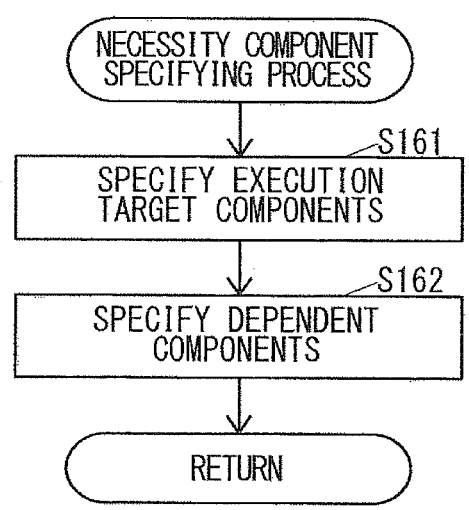
FIG. 11 is a flowchart of a necessity component specifying process illustrated in FIG. 10.

As illustrated in FIG. 10, the extension function 32 executes a necessity component specifying process illustrated in FIG. 11 (S131) in which a necessity component necessary for executing the program 60 among components of the platform 50 is specified on the basis of the codes of the program 60 passed as the argument of the function "FuncA'".

FIG. 11 is a flowchart of the necessity component specifying process illustrated in FIG. 10.

As illustrated in FIG. 11, the extension function 32 specifies the execution target components of the program 60 among components of the platform 50 on the basis of the execution target component specifying information 71 (S161). In other words, the extension function 32 specifies the components 51a to 51c as the execution target components of the program 60.

Next, the extension function 32 specifies dependent components of the execution target components specified in S161 on the basis of the dependent component specifying information 72 (S162). In other words, the extension function 32 specifies the components 51b to 51d as dependent components of the component 51a. In addition, the extension function 32 specifies the components 51c and 51e as dependent components of the component 51b. In addition, the extension function 32 specifies the components 51d and 51e as dependent components of the component 51c.

The extension function 32 specifies the component 51a as the execution target component of the function "FuncB-1" of the program 60 and the components 51b to 51d as the dependent components of the component 51a, as the necessity components of the function "FuncB-1" in the necessity component specifying process illustrated in FIG. 11. In the same manner, the extension function 32 specifies the component 51b as the execution target component of the function "FuncB-2" of the program 60 and the components 51c and 51e as the dependent components of the component 51b, as a necessity component of the function "FuncB-2". In addition, the extension function 32 specifies the component 51c as the execution target component of the function "FuncB-3" of the program 60 and the components 51d and 51e as the dependent components of the component 51c, as a necessity component of the function "FuncB-3". In other words, the extension function 32 specifies the components 51a to 51e as the necessity components of the program 60 in the necessity component specifying process illustrated in FIG. 11.

When the process of S162 is finished, the extension function 32 finishes the necessity component specifying process illustrated in FIG. 11.

As illustrated in FIG. 10, when the necessity component specifying process of S131 is finished, the extension function 32 loads the components 51a to 51e specified as the necessity components in the necessity component specifying process of S131 from the platform 50 onto the RAM, so that the components 51a to 51e can be used (S132). In other words, the extension function 32 executes the components 51a to 51e.

Next, the extension function 32 allows the program 60 to work on a temporary platform constituted of the components 51a to 51e loaded in S132, so as to perform the program 60 (S133).

Next, the extension function 32 unloads the necessity components of the program 60, namely, the components 51a to 51e from the RAM, so as to stop the components 51a to 51e (S134), and finishes the extension function execution process illustrated in FIG. 10.

As illustrated in FIG. 9, when the extension function execution process of S102 is finished, the control device 80 performs the "FuncA-2" of the program 40 so as to execute the component 31b of the platform 30(S103).

Next, the control device 80 performs the "FuncA-3" of the program 40 so as to execute the component 31c of the platform 30 (S104), and finishes the operation illustrated in FIG. 9.

As described above, the MFP 10 can perform the program 60 working on the platform 50, seamlessly without transplanting the program 60 to work on the platform 30.

In addition, when the program 40 working on the platform 30 uses the program 60 working on the platform 50, the MFP 10 loads the components 51a to 51e necessary for performing the program 60 among components of the platform 50 from the platform 50 (S132), and allows the program 60 to work on the temporary platform constituted of the loaded components 51a to 51e (S133). Thus, the program 40 working on the platform 30 can use the program 60 working on the platform 50 with a simple structure.

In addition, the MFP 10 specifies the components 51a to 51e necessary for performing the program 60 on the basis of the necessity component specifying information 70, and hence the program 40 working on the platform 30 can use the program 60 working on the platform 50 with a simple structure.

In addition, when there are a plurality of programs, i.e., other programs, working on the platform 50, the MFP 10 is not required to store the necessity component specifying information 70 independently for each of the other programs, but can store the dependent component specifying information 72 of the necessity component specifying information 70 as common information for the plurality of other programs. Thus, the program 40 working on the platform 30 can use the program 60 working on the platform 50 with a simple structure.

The present disclosure is effective for an embedded system with limited resources such as MFP 10, because the program 40 working on the platform 30 can use the program 60 working on the platform 50 with a simple structure.

Further, in this embodiment, the platform 30 and the platform 50 are realized by the same hardware configuration. However, the platform 30 and the platform 50 may be realized by different hardware configurations.

The electronic apparatus of the present disclosure is the MFP in this embodiment, but may be an image forming apparatus other than the MFP, such as a dedicated printer, a dedicated copier, or a dedicated facsimile machine, or may be an electronic apparatus other than an image forming apparatus, such as a personal computer (PC).

As described above, with the electronic apparatus according to the present disclosure, it is possible that one of two programs working on different platforms can use the other program with a simple structure.

In addition, with the method of controlling an electronic apparatus according to the present disclosure, it is possible that a program working on a platform can use another program working on another platform with a simple structure.

What is claimed is:
1. An electronic apparatus, comprising:
a storage device storing a first platform, a first program working on the first platform, a second platform, and a second program working on the second platform; and
a control device that performs the first program working on the first platform so as to execute at least one component of the first platform,
wherein:
the first platform includes a second program using unit for the first program to use the second program executing at least one component of the second platform; and
the second program using unit loads a necessity component necessary for performing the second program among components of the second platform from the second platform so that the second program can work on a temporary platform constituted of the loaded necessity component,
wherein:
the storage device stores necessity component specifying information for specifying the necessity component; and
the second program using unit specifies the necessity component on the basis of the necessity component specifying information, and
wherein:
the necessity component specifying information includes (i) execution target component specifying information for specifying an execution target component as an execution target of the second program among components of the second platform, and (ii) dependent component specifying information for specifying a depen- dent component necessary for the execution target component to be an active state among components of the second platform; and the second program using unit specifies (i) the execution target component specified on the basis of the second program and the execution target component specifying information, and (ii) the dependent component specified on the basis of the execution target component and the dependent component specifying information, as the necessity component.

2. A method of controlling an electronic apparatus, comprising:

causing the electronic apparatus to store a first platform, a first program working on the first platform, a second platform, and a second program working on the second platform;

performing the first program working on the first platform so as to execute at least one component of the first platform;

causing the first program to use the second program executing at least one component of the second platform;

causing the electronic apparatus to further store necessity component specifying information for specifying a necessity component necessary for performing the second program among components of the second platform, wherein the necessity component specifying information includes (i) execution target component specifying information for specifying an execution target component as an execution target of the second program among components of the second platform, and (ii) dependent component specifying information for specifying a dependent component necessary for the execution target component to be an active state among components of the second platform;

specifying the necessity component on the basis of the necessity component specifying information, wherein (i) the execution target component specified on the basis of the second program and the execution target component specifying information, and (ii) the dependent component specified on the basis of the execution target component and the dependent component specifying information, are specified as the necessity component; and loading the specified necessity component from the second platform so that the second program can work on a temporary platform constituted of the loaded necessity component.

* * * * *